United States Patent

Satoh et al.

[11] Patent Number: 5,333,932
[45] Date of Patent: Aug. 2, 1994

[54] SEAT RECLINING APPARATUS

[75] Inventors: Munetaka Satoh, Kariya; Sadao Ito, Anjo; Hiroshi Nawa, Kariya, all of Japan

[73] Assignee: Aisin Seiki Kabushiki Kaisha, Kariya, Japan

[21] Appl. No.: 22,028

[22] Filed: Feb. 25, 1993

[30] Foreign Application Priority Data

Feb. 28, 1992 [JP] Japan .................................. 4-43994

[51] Int. Cl.$^5$ .............................................. B60N 2/02
[52] U.S. Cl. .................................. 297/362; 297/354.12
[58] Field of Search ............ 297/354.1, 354.12, 361.1, 297/362, 362.11, 362.12, 362.13, 362.14

[56] References Cited

U.S. PATENT DOCUMENTS

| | | | |
|---|---|---|---|
| 4,332,418 | 6/1982 | Strowik | 297/362 |
| 4,629,251 | 12/1986 | Tezuka | 297/362 |

FOREIGN PATENT DOCUMENTS

| | | | |
|---|---|---|---|
| 0048294 | 3/1982 | European Pat. Off. | 297/362 |
| 2-141228 | 11/1990 | Japan . | |

Primary Examiner—Kenneth J. Dorner
Assistant Examiner—Milton Nelson, Jr.
Attorney, Agent, or Firm—Finnegan, Henderson, Farabow, Garrett and Dunner

[57] ABSTRACT

A seat reclining apparatus is comprised of a pair of lower arms for supporting a seat-cushion, a lower plate having a first gear, a rivet for securing the lower plate to each of the lower arms after being passed through an aperture of the lower plate, a pair of upper arms for supporting a seat-back, an upper plate secured to each of the lower arms and having a second gear which is in meshing engagement with the first gear, and a shaft having a centric portion and an eccentric portion for rotatably mounting thereon the lower plate and the upper plate, respectively, wherein the rivet is formed into a stepped configuration in such a manner that the rivet has a first portion larger than the aperture in diameter and located between the lower arm and the lower plate, and a second portion larger than the first portion in diameter and located between the first portion and the lower arm, and an outer periphery of the upper plate is held between the second portion and the lower plate.

3 Claims, 3 Drawing Sheets

SEAT RECLINING APPARATUS

BACKGROUND OF THE INVENTION

The present invention relates to a seat reclining apparatus.

In a conventional seat reclining apparatus which is disclosed in Japanese Utility Model Laid-open Print No. Hei 2(1990)-141228, as shown in FIG. 4, a pair of lower arms 51 (only one is shown) are set to serve for supporting a common seat-cushion (not shown), and each lower arm 51 is secured, via a rivet 55, with a lower plate 53 provided with an outer gear 53a. A pair of upper arms 52 (only one is shown) are set to support a seat-back (not shown), and each upper arm 52 is secured, via a rivet 56, with an upper plate 54 having an inner gear 54a which is in meshing engagement with the outer gear 53a. The lower plate 53 and the upper plate 54 are fitted therein with a common shaft 57 in such a manner that the lower plate 53 and the upper plate 54 are rotatably mounted on a centric portion 57a and an eccentric portion 57b of the shaft 57, respectively. In addition, the upper plate 54 is interposed between the lower arm 51 and the lower plate 53 which is secured thereto by the rivet 55 so that a left portion of the upper plate is held by a right portion of the lower arm 51.

However, a gap between a portion at which the lower arm 51 is secured with the lower plate 53 and a plane at which the lower arm 51 holds the upper plate 54 becomes large, which leads to a fear that the lower arm 51 is subject to deform in the direction of X upon application of a force in the same direction. Thus, a clearance may generate between the lower arm 51 and the upper plate 54, whereby an axial play is generated at the upper plate 54, the meshing engagement between the inner gear 54a and the outer gear 53a becomes imperfect, and mechanical strength therebetween becomes poor. In the light of the fact that the upper plate 54 is held by the lower arm 51, in order to prevent the deformation of the lower arm 51 in the direction of X, the lower arm 51 is compelled to be pressed onto the upper plate 54 entirely. This means that a high precise press is required for holding the upper plate 54 at the lower arm 51.

SUMMARY OF THE INVENTION

It is an object of the present invention to provide an improved seat reclining apparatus without the foregoing drawbacks.

It is another object of the present invention to provide an improved seat reclining apparatus in which an upper plate is prevented being played in its axial direction.

It is further object of the present invention to provide an improved seat reclining apparatus which can be obtained without a high precise press for the holding of the upper plate at the lower arm.

In order to attain the foregoing objects, a seat reclining apparatus is comprised of a pair of lower arms for supporting a seat-cushion, a lower plate having a first gear, a rivet for securing the lower plate to each of the lower arms after being passed through an aperture of the lower plate, a pair of upper arms for supporting a seat-back, an upper plate secured to each of the lower arms and having a second gear which is in meshing engagement with the first gear, and a shaft having a centric portion and an eccentric portion for rotatably mounting thereon the lower plate and the upper plate, respectively, wherein the rivet is formed into a stepped configuration in such a manner that the rivet has a first portion larger than the aperture in diameter and located between the lower arm and the lower plate, and a second portion larger than the first portion in diameter and located between the first portion and the lower arm, and an outer periphery of the upper plate is held between the the second portion and the lower plate.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENT

Figure 1:
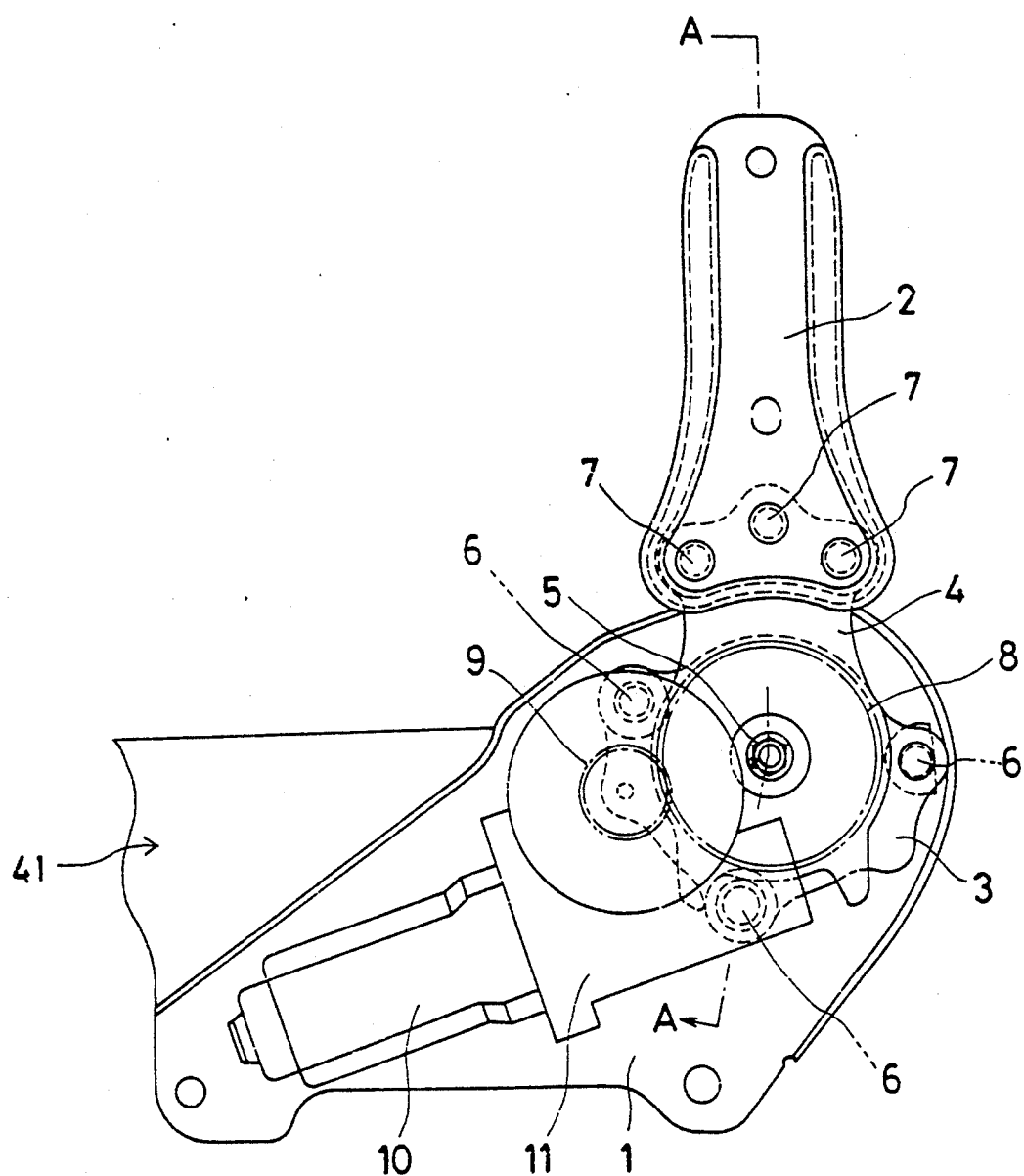
FIG. 1 is a front view of a seat reclining apparatus according to the present invention.
Figure 2:
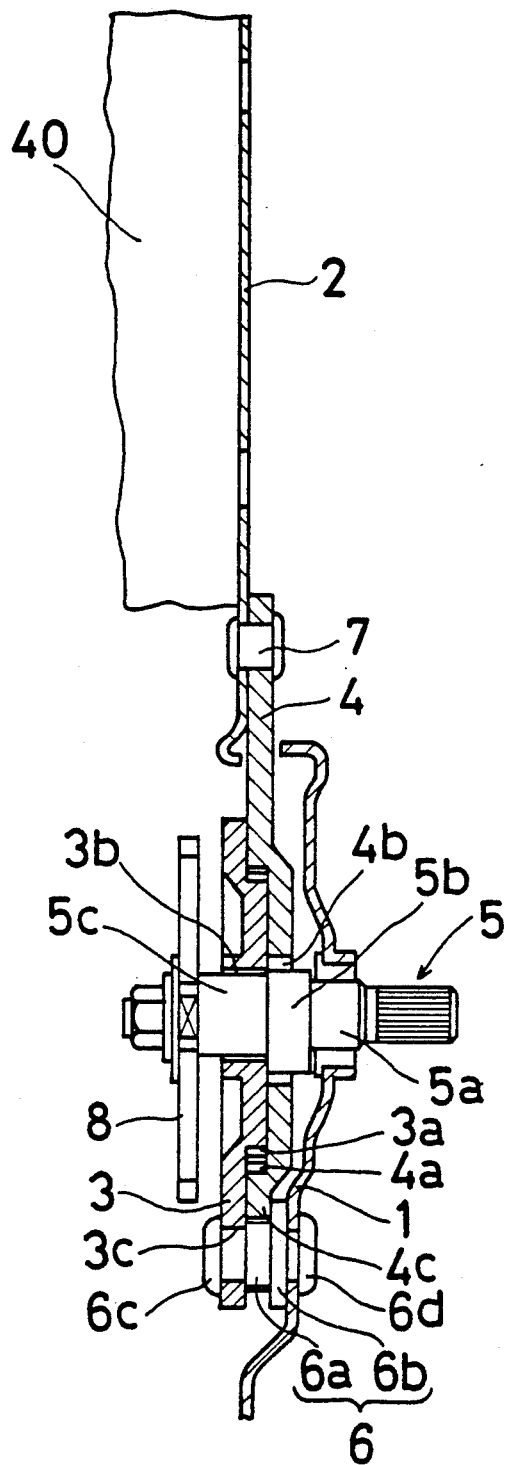
FIG. 2 is a cross-sectional view taken along line A—A in FIG. 1.
Figure 4:
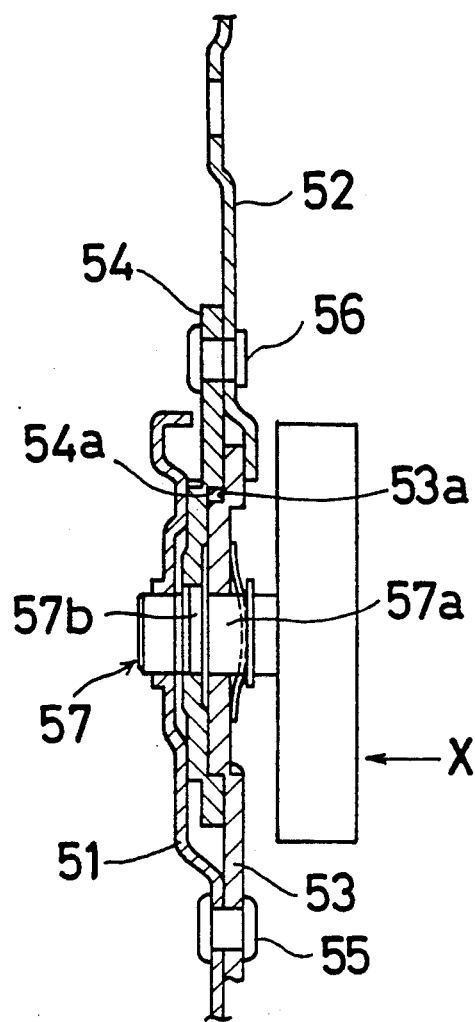
FIG. 4 is a front view of a conventional seat reclining apparatus.
Figure 3:
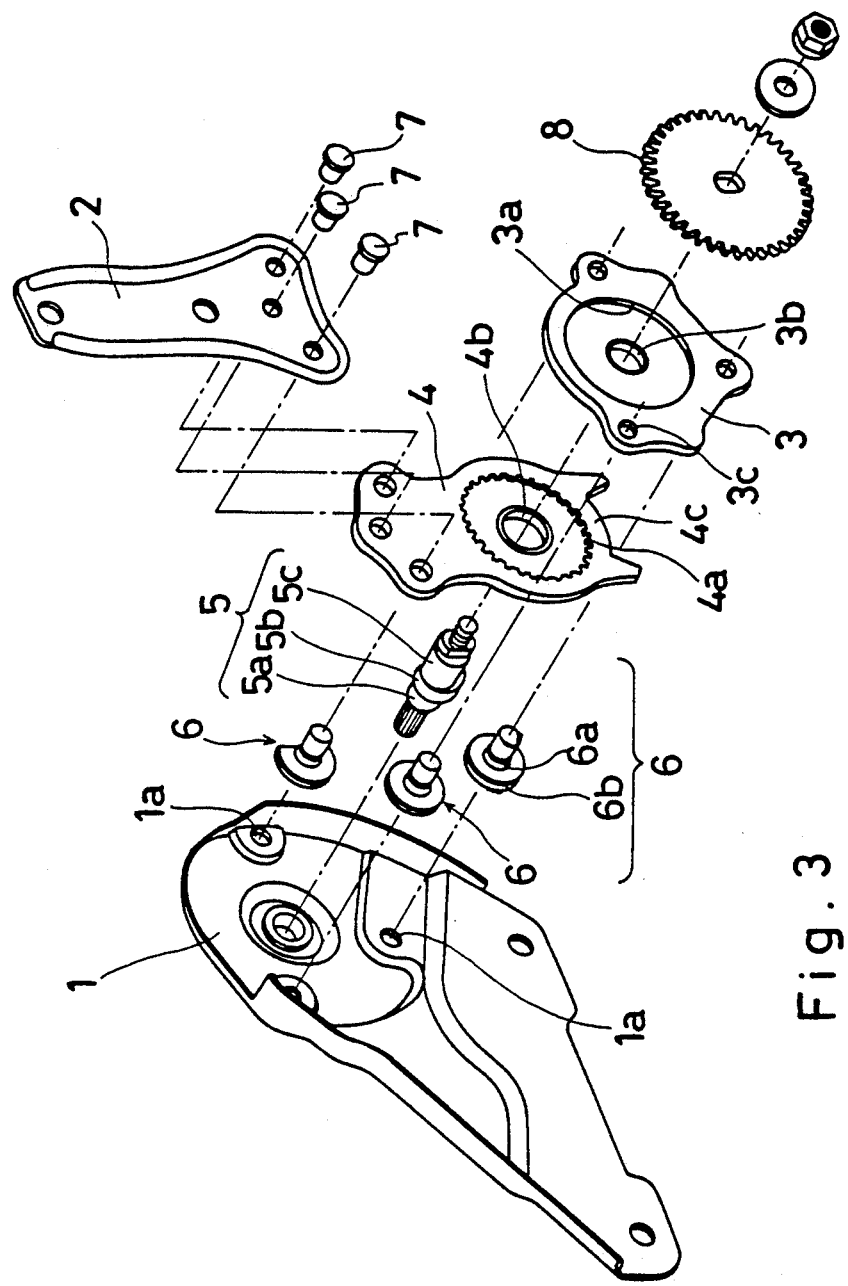
FIG. 3 is an exploded perspective view of the portion in FIG. 2.

Referring to FIGS.1 through 3, a pair of upper arms 2 (only one is shown) serve for supporting a seat-back 40, and each upper arm 2 is secured with an upper plate 4 by plural rivets 7. At a substantially central portion of the upper plate 4, an aperture 4b is formed around which an inner gear 4a is arranged.

A pair of lower arms 1 (only one is shown) serve for supporting a seat-cushion 41, and each lower arm 1 is secured with a lower plate 3 via plural rivets 6 each of which will be detailed later. At a substantially central portion of the lower plate 3, an aperture 3b is formed around which an outer gear 3a is provided so as to be in meshing engagement with the inner gear 4a. The number of teeth of the outer gear 3a is set to be less than that of the inner gear 4a by one.

The lower arm 1, the aperture 3b of the lower plate 3 and the aperture 4b of the upper plate 4 are passed therethrough with a common shaft 5. That is to say, the lower arm 1 is rotatably mounted on a centric portion 5a of the shaft 5. The lower plate 3 is rotatably mounted on a centric portion 5c of the shaft 5 so that the outer gear 3a is rotatable thereabout. Between the centric portions 5a and 5c of the shaft 5, there is provided an eccentric portion 5b which is out of axis relative to the centric portions 5a and 5c , and the upper plate 4 is rotatably mounted on the eccentric portion 5b so that the inner gear 4a is rotatable thereabout. Thus, when a full rotation or 360° rotation of the shaft 5 brings one teeth rotation of the upper plate 4 relative to the lower plate 3.

As illustrated in FIG. 3, the upper plate 4 is interposed between the lower arm 1 and the lower plate 3, and as previously mentioned the lower plate 3 is secured to the lower arm 1 by the rivets 6. Each rivet 6, which is in the form of a stepped structure, has a head portion 6c to be riveted, a first portion 6a set to be larger than an aperture 3c of the lower plate 3 in radius and to be located between the lower plate 3 and the lower arm 1, a second portion 6b set to be larger than the first portion 6a and to be located between the first portion 6a and the lower arm 1, a tail portion 6c to be riveted which are arranged in this order.

The lower plate 3 is held in the neighbourhood of the aperture 3c by the first portion 6a and the riveted tail portion 6c. In addition, the second portion 6b and the lower plate 3 hold therebetween a lower portion 4c of the upper plate 4 as best shown in FIG. 2. It is to be noted that the height of the first portion 6a is set to be slightly larger than the thickness of the upper plate 4 in order to establish a slight clearance between an outer periphery 4c of the upper plate 4 and the lower plate 3 (or between an outer periphery 4c of the upper plate 4 and the second portion 6c). The resultant clearance will assure the rotation of the upper plate 4 in the lengthwise direction of the vehicle body.

At an end of the shaft 5 which is near the lower plate 3, there is fixedly mounted a larger diameter gear 8 which is in meshing engagement with a smaller diameter gear 9 belonging to a reducing mechanism 11. The reducing mechanism 11 has a motor 10 which is arranged at one side of the apparatus and an output of the motor 10 is set to be transmitted to the other side of the apparatus via a connecting rod (not shown).

In operation, when the motor 10 is turned on, the output or rotation thereof is, via the reduce mechanism 11, the smaller diameter gear 9 and the larger diameter gear 8, transmitted to the shaft 5, thereby establishing the rotation of the shaft 5. The resultant rotation rotates the upper plate 4 relative to the lower plate 3 according to the difference of the number of teeth between the outer gear 4a and the inner gear 3a, which results in that the seat-back is rotated through an angle about the shaft 5 and the reclining angle of the seat-back 40 is adjusted.

In the present embodiment, the outer periphery of the upper plate 4 is held between the second portion 6b of the rivet 6 and the lower plate 3, which enables the prevention of an axial play of the upper plate 4 and the inclination of the upper plate 4 is oriented to the lengthwise direction fails to form an unnecessary or undesired clearance. Thus, a smooth rotation of the upper plate 4 can be established, and a required meshing engagement with a sufficient strength between the outer gear 3a of the lower plate 4 and the inner gear 4a of the upper plate 4.

Moreover, in the present embodiment, the upper plate 4 is not held at the side of the lower arm 1, but is configured in such a manner that while the outer periphery 4c of the upper plate 4 is being held between the lower plate 3 and the second portion 6b of the rivet 6 the both ends are pressed or riveted, which leads to eliminate an precise press method.

Obviously, many modifications and variations of the present invention are possible in light of the above teachings. It is, therefore, to be understood that within the scope of the appended claims, the invention may be practiced otherwise than as specifically described.

What is claimed is:

1. A seat reclining apparatus comprising:
    a lower arm for supporting a seat-cushion;
    a lower plate having a first gear;
    a rivet securing the lower plate to the lower arm after being passed through an aperture of the lower plate;
    an upper arm for supporting a seat-back;
    an upper plate secured to the lower arm and having a second gear in meshing engagement with the first gear; and
    a shaft having a centric portion and an eccentric portion, the lower plate and the upper plate being rotatably mounted on the centric portion and the eccentric portion respectively, wherein the rivet is formed into a stepped configuration in such a manner that the rivet has a first portion larger than the aperture in diameter and located between the lower arm and the lower plate, and a second portion larger than the first portion in diameter and located between the first portion and the lower arm, and an outer periphery of the upper plate held between the second portion and the lower plate.

2. A seat reclining apparatus in accordance with claim 1, wherein an end of the rivet is in engagement with a side of the lower plate and an opposite end of the rivet is in engagement with a side of the lower arm.

3. A seat reclining apparatus in accordance with claim 1, wherein the first gear is an outer gear and the second gear is an inner gear.

* * * * *